United States Patent
Koestler

(10) Patent No.: US 7,685,174 B2
(45) Date of Patent: Mar. 23, 2010

(54) AUTOMATIC REGENERATION OF COMPUTER FILES

(75) Inventor: Luke Koestler, Vicksburg, MS (US)

(73) Assignee: Seventh Knight Inc., Vicksburg, MS (US)

( * ) Notice: Subject to any disclaimer, the term of this patent is extended or adjusted under 35 U.S.C. 154(b) by 793 days.

(21) Appl. No.: 10/885,638

(22) Filed: Jul. 8, 2004

(65) Prior Publication Data

US 2005/0120063 A1    Jun. 2, 2005

Related U.S. Application Data

(60) Provisional application No. 60/485,160, filed on Jul. 8, 2003.

(51) Int. Cl.
G06F 12/00 (2006.01)
G06F 15/173 (2006.01)

(52) U.S. Cl. ............... 707/204; 707/205; 709/224

(58) Field of Classification Search .......... 707/1–10, 707/100–102, 104.1, 200–205; 709/217–224, 709/229
See application file for complete search history.

(56) References Cited

U.S. PATENT DOCUMENTS

| | | | | |
|---|---|---|---|---|
| 5,408,642 A * | 4/1995 | Mann | ........... | 714/38 |
| 5,638,509 A * | 6/1997 | Dunphy et al. | ........... | 714/20 |
| 5,745,669 A * | 4/1998 | Hugard et al. | ........... | 714/3 |
| 5,771,354 A * | 6/1998 | Crawford | ........... | 709/229 |
| 5,797,016 A * | 8/1998 | Chen et al. | ........... | 717/171 |
| 5,845,293 A * | 12/1998 | Veghte et al. | ........... | 707/202 |
| 5,852,713 A * | 12/1998 | Shannon | ........... | 714/6 |
| 5,857,205 A * | 1/1999 | Roth | ........... | 707/203 |
| 6,026,414 A * | 2/2000 | Anglin | ........... | 707/204 |
| 6,035,264 A * | 3/2000 | Donaldson et al. | ........... | 702/182 |
| 6,195,695 B1 * | 2/2001 | Cheston et al. | ........... | 709/221 |
| 6,212,512 B1 * | 4/2001 | Barney et al. | ........... | 707/1 |
| 6,275,942 B1 | 8/2001 | Bernhard et al. | | |
| 6,363,498 B1 * | 3/2002 | Howell | ........... | 714/15 |
| 6,374,401 B1 * | 4/2002 | Curtis | ........... | 717/175 |
| 6,389,427 B1 * | 5/2002 | Faulkner | ........... | 707/104.1 |
| 6,460,055 B1 * | 10/2002 | Midgley et al. | ........... | 707/204 |
| 6,560,617 B1 * | 5/2003 | Winger et al. | ........... | 707/204 |
| 6,560,719 B1 * | 5/2003 | Pham et al. | ........... | 714/15 |
| 6,604,236 B1 * | 8/2003 | Draper et al. | ........... | 717/170 |
| 6,611,850 B1 * | 8/2003 | Shen | ........... | 707/204 |

(Continued)

FOREIGN PATENT DOCUMENTS

WO    WO 03/021402    3/2003

OTHER PUBLICATIONS

Williams, R.N., "Data Integrity With Veracity", Internet Citation, Sep. 12, 1994.

(Continued)

*Primary Examiner*—Miranda Le
(74) *Attorney, Agent, or Firm*—Finnegan, Henderson, Farabow, Garrett & Dunner L.L.P.

(57) ABSTRACT

A method for regenerating computer files on a computer system having a computer with an operating system, the method includes receiving an input from a user to specify monitored files, detecting modification of at least one of the monitored files, and replacing the at least one modified monitored file with a backup copy of the at least one modified monitored file.

37 Claims, 4 Drawing Sheets

U.S. PATENT DOCUMENTS

| | | | |
|---|---|---|---|
| 6,618,735 B1* | 9/2003 | Krishnaswami et al. | 707/203 |
| 6,675,177 B1* | 1/2004 | Webb | 707/200 |
| 6,785,786 B1* | 8/2004 | Gold et al. | 711/162 |
| 6,802,025 B1* | 10/2004 | Thomas et al. | 714/15 |
| 6,839,721 B2* | 1/2005 | Schwols | 707/200 |
| 6,847,983 B2* | 1/2005 | Somalwar et al. | 707/203 |
| 6,882,271 B2* | 4/2005 | Hendrickson | 340/504 |
| 6,898,600 B2* | 5/2005 | Fruchtman et al. | 707/10 |
| 6,931,440 B1* | 8/2005 | Blumenau et al. | 709/220 |
| 6,931,558 B1* | 8/2005 | Jeffe et al. | 713/340 |
| 6,971,018 B1* | 11/2005 | Witt et al. | 713/187 |
| 6,985,915 B2* | 1/2006 | Somalwar et al. | 707/203 |
| 7,051,053 B2* | 5/2006 | Sinha | 707/204 |
| 7,085,852 B2* | 8/2006 | Kumar et al. | 709/248 |
| 7,143,113 B2* | 11/2006 | Radatti | 707/200 |
| 7,210,118 B2* | 4/2007 | Hastings | 717/100 |
| 7,216,169 B2* | 5/2007 | Clinton et al. | 709/224 |
| 2002/0023226 A1* | 2/2002 | Takagi | 713/201 |
| 2002/0073106 A1 | 6/2002 | Parker et al. | |
| 2002/0095317 A1* | 7/2002 | McCabe | 705/4 |
| 2003/0004882 A1 | 1/2003 | Holler et al. | |
| 2003/0115458 A1* | 6/2003 | Song | 713/165 |
| 2003/0135791 A1* | 7/2003 | Natvig | 714/38 |
| 2003/0140049 A1* | 7/2003 | Radatti | 707/100 |
| 2003/0140253 A1* | 7/2003 | Crosbie et al. | 713/201 |
| 2004/0010732 A1* | 1/2004 | Oka | 714/13 |
| 2004/0039868 A1* | 2/2004 | Lush | 711/4 |
| 2004/0107199 A1* | 6/2004 | Dalrymple et al. | 707/100 |
| 2004/0107217 A1* | 6/2004 | Hastings | 707/104.1 |
| 2004/0250107 A1* | 12/2004 | Guo | 713/200 |
| 2006/0079254 A1* | 4/2006 | Hogan | 455/466 |

OTHER PUBLICATIONS

McKosky, R.A., et al. "A File Integrity Checking System to Detect and Recover From Program Modification Attacks in Multi-User Computer Systems", Computers & Security, vol. 9, No. 5, Aug. 1, 1990, Amsterdam, NL.

PCT International Search Report mailed Jul. 1, 2005, in corresponding International Application No. PCT/US2004/021945 (12 pgs.).

PCT International Preliminary Examination Report mailed Jan. 19, 2006 in corresponding International Application No. PCT/US2004/021945 (7 pgs.).

* cited by examiner

US 7,685,174 B2

AUTOMATIC REGENERATION OF COMPUTER FILES

RELATED APPLICATIONS

This non-provisional application is related to and claims priority of Provisional Application No. 60/485,160 filed on Jul. 8, 2003, in the name of Luke KOESTLER, and titled AUTOMATIC REGENERATION OF COMPUTER FILES, the contents of which are fully incorporated herein by reference.

TECHNICAL FIELD

This invention relates to the field of automatic regeneration of computer files.

BACKGROUND

Computers, and especially network-connected computers, are present in almost every phase of today's society. Also present, unfortunately, are many types of technological attacks on such computers. Such attacks may come in the form of viruses, worms, Trojan horses, adware, spyware, and others. Although forms of protection, such as anti-virus software using a signature-based techniques, are currently available, there remain many types of threats that are not detected by currently available solutions, even if such solutions are updated on a daily basis. Accordingly, it is desirable to provide methods and apparatus offering increased security to computers and computer systems from known and unknown technological threats.

SUMMARY

Consistent with the invention, systems and methods are provided for regenerating computer files on a computer system having a computer with an operating system. The method includes receiving an input from a user to specify monitored files, automatically detecting modification of at least one of the monitored files, and automatically replacing the at least one modified monitored file with a backup copy of the at least one modified monitored file.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Reference will now be made in detail to the embodiments consistent with the invention, examples of which are illustrated in the accompanying drawings. Wherever possible, the same reference numbers will be used throughout the drawings to refer to the same or like parts.

Consistent with the invention, an automatic file regenerator works in unison with a process authenticator to provide layers of security to protect computer systems. Unlike conventional anti-virus software that must refer to a database of known threats, the process authenticator reverses this process by building a database of known good code, that is, software and scripts approved by the system administrators. A suitable process authenticator is described further in U.S. patent application Ser. No. 10/252,110, filed Sep. 24, 2002. the contents of which are incorporated by reference herein in their entirety. Any code that has not been approved by an administrator, such as a virus that the anti-virus software could not yet detect, is not allowed to execute on the server or the local computer system. No software is allowed to execute unless specifically approved.

Consistent with the invention, an automatic file regenerator, which provides automatic file regeneration capabilities, is described herein. The automatic file regenerator maintains data integrity of files and data stored in computers. For example, the automatic file generator can ensure data integrity for enterprise servers running critical services that must be available around-the-clock. The automatic file regenerator replaces modified or corrupt data with a fresh copy of the user-approved original. When, for example, an intruder modifies or deletes data from the computer, the automatic file regenerator replaces the data with a fresh copy of the original. In essence, the automatic file regenerator allows a computer to heal itself automatically, time and time again.

Figure 1:
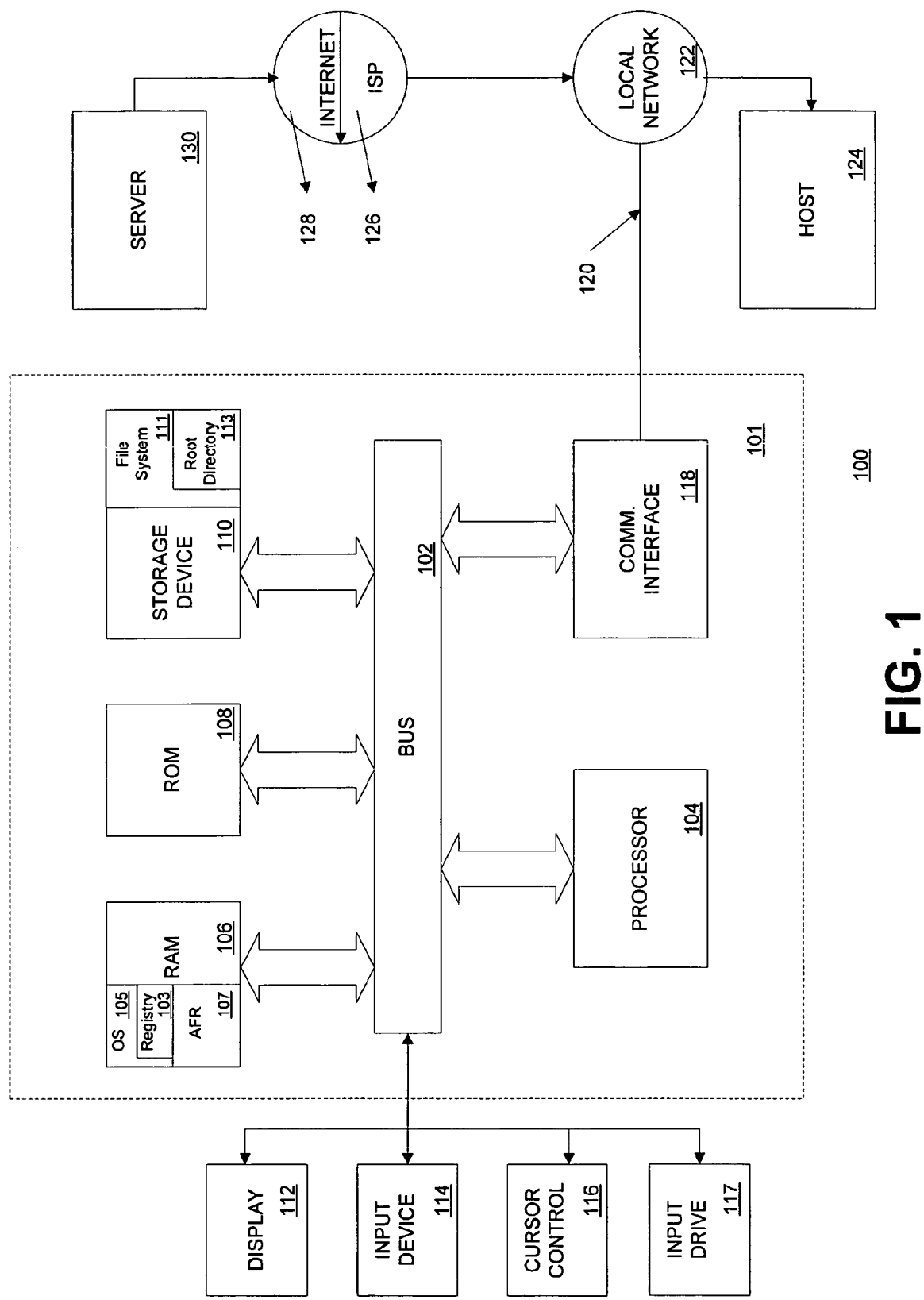
FIG. 1 shows a diagram depicting an exemplary computer system in which systems and methods consistent with the principles of the present may be implemented.

Systems and methods consistent with the present invention may be implemented by computers organized in a conventional distributed processing system architecture. FIG. 1 is a block diagram illustrating a computer system 100 in which an embodiment consistent with the invention may be implemented. Computer system 100 includes a computer 101 having a bus 102 or other communication mechanism for communicating information, and a processor 104 coupled with bus 102 for processing information. Computer 101 also includes a main memory, such as random access memory (RAM) 106 or other dynamic storage device, coupled to bus 102 for storing information and instructions to be executed by processor 104, RAM 106 also may be used for storing temporary variables or other intermediate information during execution of instructions to be executed by processor 104. During operation, some or all portions of an operating system 105 are loaded into RAM 106. Computer 101 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions. A file system 111 including a plurality of root directories 113 may be stored in storage device 110.

Computer 101 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (e.g., x) and a second axis (e.g., y), which allow the device to specify positions in a plane.

System 100 may further include an input drive device 117, such as a CD reader, for reading high-capacity computer-readable media, such as CD-ROMs and CDRs.

The invention is related to the use of computer system 100 for monitoring and regenerating files on a computer system or network. According to one implementation, systems and methods consistent with the present invention collect system information and store it in a central database in response to processor 104 executing one or more sequences of one or more instructions contained in RAM 106. Such instructions may be read into RAM 106 from a computer-readable medium via an input device such as storage device 110. Execution of the sequences of instructions contained in main memory 106 causes processor 104 to perform the process steps described herein. In an alternative implementation, hard-wired circuitry may be used in place of or in combination with software instructions to implement the invention. Thus, implementations consistent with the principles of the present invention are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge or any other physical storage medium from which a computer can read.

Various forms of computer-readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer 101 also includes a communication interface 118 coupled to bus 102. Communication interface 118 provides a two-way data communication coupling to a network link 120 that is connected to local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to host computer 124 and/or to data equipment operated by Internet Service Provider (ISP) 126. ISP 126, in turn, provides data communication services through the Internet 128. Local network 122 and Internet 128 both use electric, electromagnetic or optical signals that carry digital data streams. The signals through the various networks and the signals on network link 120 and through communication interface 118, which carry the digital data to and from computer system 100, are exemplary forms of carrier waves transporting the information.

Figure 4:
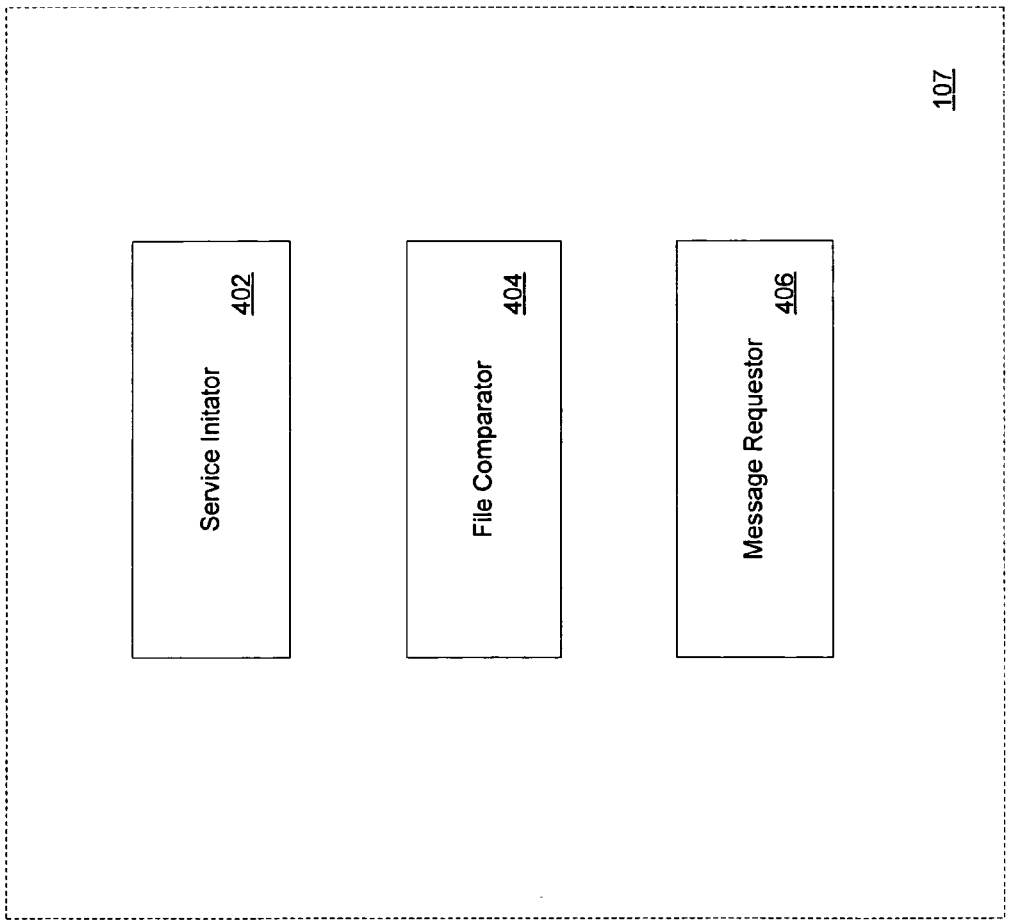
FIG. 4 is a detailed diagram of the automatic file regenerator shown in FIG. 1.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. Consistent with the present invention, one such downloaded application in the form of an automatic file regenerator 107 automatically regenerates files on a computer system. The structure of automatic file regenerator 107 is shown in more detail in FIG. 4 and will be described below. The received code may be loaded in RAM 106 and executed by processor 104 as it is received. Alternatively, or in addition, it may be stored in storage device 110, or other non-volatile storage for later execution. In this manner, computer system 100 may obtain application code in the form of a carrier wave.

Although computer system 100 is shown in FIG. 1 as being connectable to one server 130, those skilled in the art will recognize that computer system 100 may establish connections to multiple servers on Internet 128. Such servers may include an HTML-based Internet application, which may provide information to computer system 100 upon request in a manner consistent with the present invention.

Figure 2:
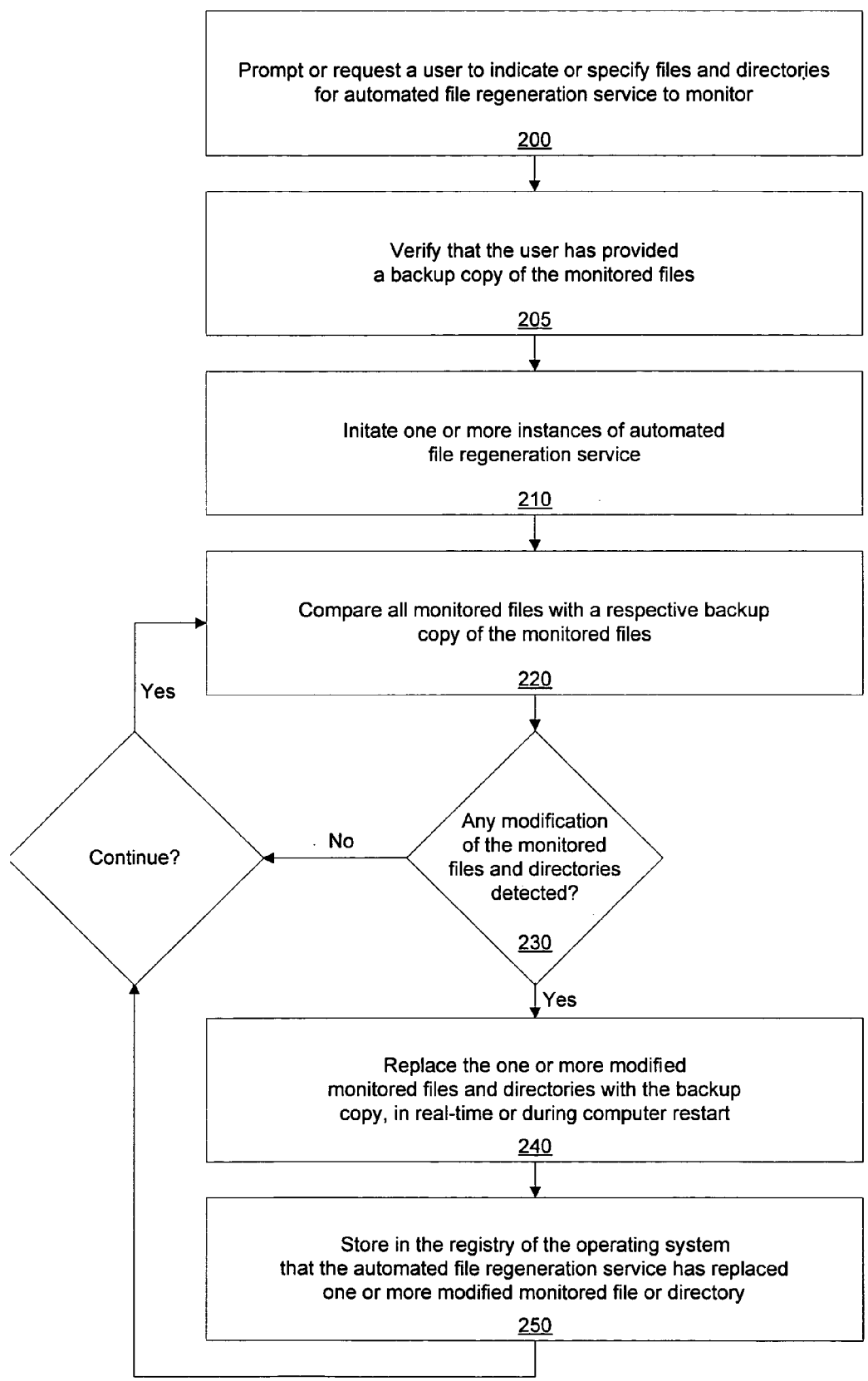
FIG. 2 shows a flowchart depicting the steps performed by an automatic file regenerator consistent with the principles of the present invention.
Figure 3:
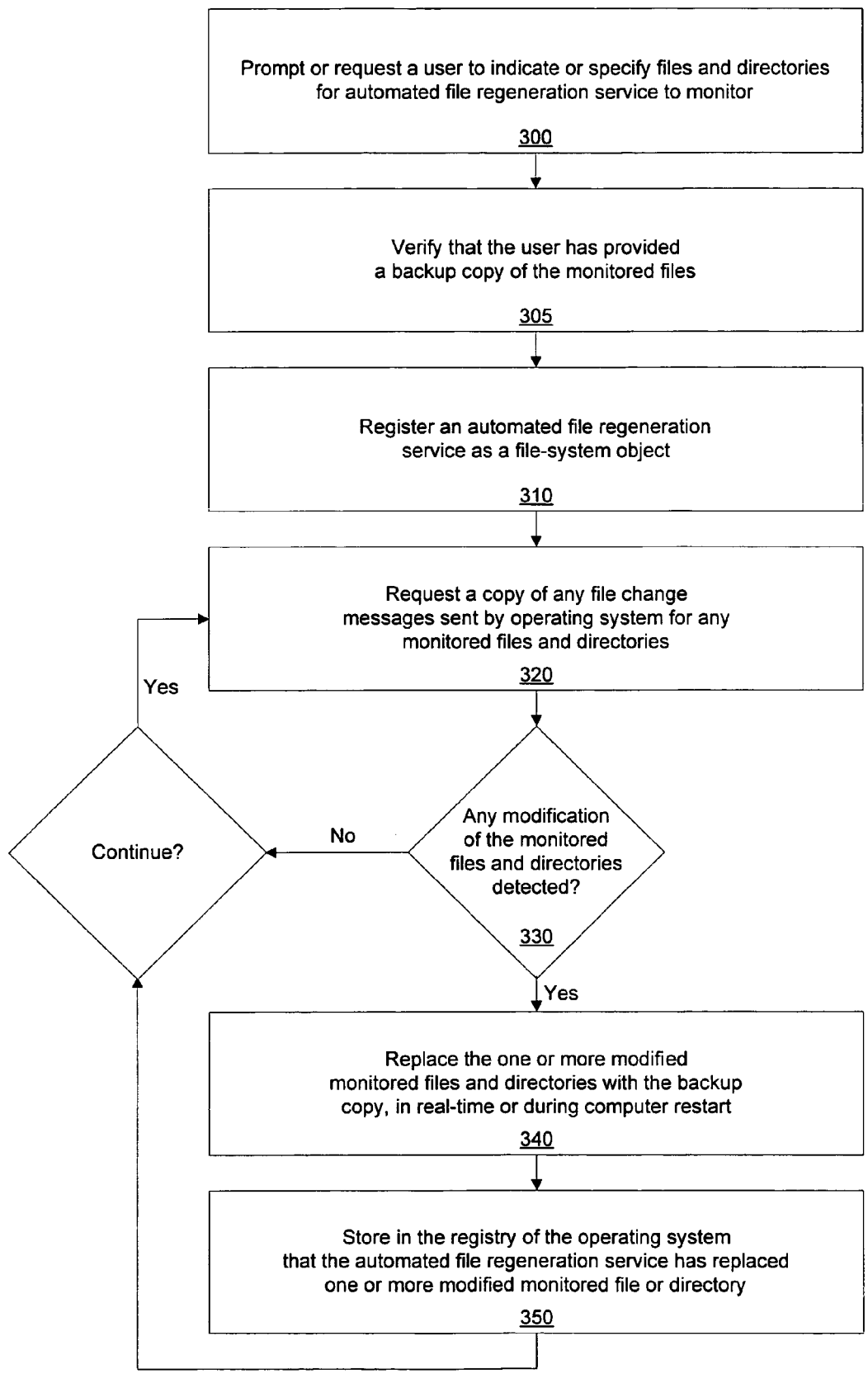
FIG. 3 shows a flowchart depicting the steps performed by an automatic file regenerator also consistent with the principles of the present invention.

FIG. 2 and 3 show flowcharts depicting exemplary methods for automatic regeneration of computer files performed by automatic file regenerator 107 (shown in FIG. 4) on computer system 100 consistent with the principles of the present invention. A first method (FIG. 2) begins by prompting or requesting input from a user, for example, a system administrator, to indicate or specify files and directories for the automatic file regenerator to monitor, step 200. Monitored files may be any type of file, such as but not limited to documents, programs, web pages, and scripts. Monitored files are files that have been specified by the user as read-only files, files that do not change, or system files. In one embodiment, monitored files are stored in one or more root directories. The method may verify that the user has provided a backup copy of the monitored files, step 205. If a computer running the automatic file regenerator detects that a monitored file has been modified, renamed, or deleted, then the monitored file is replaced with the backup copy of the original, usually within seconds. In some instances the modified monitored file is replaced when the computer is restarted.

In one configuration, a service initiator 402 (FIG. 4) initiates an instance of automatic file regeneration service for each root directory specified by the user, step 210. The automatic file regeneration service may be a low-level system service. The service activates a file comparator 404 to detect any modification of the monitored files by comparing attributes such as file size, file name, and binary file composition of the monitored files against the backup copy of the monitored files, step 220. The automatic file regeneration service cycles through and compares all monitored files with the respective backup copy once every cycle. The length of a cycle is set or turned off using a registry value where, for example, 0=off, 1=1 minute, 2=2 minutes, etc. If the service detects modification of any of the monitored files, step 230, it replaces the modified monitored files with a backup copy of the original, step 240.

Once the automatic file regeneration service replaces modified monitored files with a backup copy of the original, the service records an entry in a registry 103 of operating system 105, step 250. Each service record may indicate the name of the replaced files, time when the service detected the modification, time when the service replaced the modified files, and other information.

The process between steps 220-250 is repeated until the user stops the automatic file regenerator, turns off the computer, or otherwise indicates a desire to terminate the process.

A second method consistent with the invention is shown in FIG. 3. The method first prompts or requests input from a user, for example, a system administrator, to indicate or specify files and directories for the automatic file regenerator to monitor, step 300. The method may verify that the user has provided a backup copy of the monitored files, step 305. The method then registers the automatic file regeneration service as a file-system object, step 310. A message requestor 408 requests a copy of any file change messages sent by the operating system 105 for any directories and sub-directories within the root directory specified by the user for the instance of the file regeneration service, step 320. For example, the system may audit information from monitored file systems or directories using the processes and method described in U.S. patent application Ser. No. 10/216,917, filed Aug. 13, 2002, entitled "Auditing Computer System Components in a Network," the contents of which are incorporated by reference herein in their entirety. If the service receives a message of modification of any of the monitored files, step 330, it replaces the modified monitored files with a backup copy of the original, step 340.

Once the automatic file regeneration service replaces modified monitored files with a backup copy of the original, the service records an entry in the registry of operating system 105, step 350. Each service record may indicate the name of the replaced files, time when the service detected the modification, time when the service replaced the modified files, and other information.

The process between steps 320-350 is repeated until the user stops the automatic file regenerator, turn off the computer, or otherwise indicates a desire to terminate the process.

The automatic file regenerator cannot replace files that are marked as "in use" or locked by the operating system 105 or another program. However, in most cases these files are replaced as soon as the operating system 105 or the other program releases the lock or revokes the "in use" status of the modified files. It is important to note that the system or the local system account must possess full rights to the monitored files and read-only rights to the backup copy of the monitored files. Preferably, the automatic file regenerator uses read-only media, such as a CD-ROM or CDR, to store backup copies of the monitored files. Alternatively, the automatic file regenerator may store the backup copy on another server 124 or 130, on device 110, or on any computer-readable medium.

Both methods of detecting file modification require no user interaction, and only replace files that have been modified or removed. The methods use no resources of computer 101 unless the automatic file regenerator is actively restoring a file or directory. One of ordinary skill in the art will recognize that the configurations described above are embodiments of the present invention, and other configurations may be practiced in a manner consistent with the principles of the present invention, Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer with an operating system, the computer comprising:
   an input receiving device operable to receive an input from a user to specify operative files used by the computer to be monitored, the specified files being a subset of files used by the computer; and
   a file regenerator operable to:
   verify that the user has provided backup copies of the operative files for replacing the operative files;
   monitor the operative files;
   compare the operative files with the backup files, or receive messages indicating modifications to the operative files;
   detect modification of one of the operative files based on the comparing or one of the received messages while monitoring the operative files;
   initiate replacement of the modified operative file with the backup copy of the modified operative file, the replacement of the modified operative file being initiated upon detecting the modification of the operative file regardless of whether the modification is a valid modification;
   complete the replacement of the modified operative file with the backup copy of the modified operative file; and
   store an indication that the modified operative file is replaced with the backup copy of the modified operative file.

2. The computer of claim 1, comprising:
   a service initiator operable to initiate the file regenerator.

3. The computer of claim 2, wherein the file regenerator compares attributes of the operative files and the backup copies.

4. The computer of claim 3, comprising:
   a computer registry operable to store the indication in a computer operating system registry when the file regenerator replaces the modified operative file.

5. The computer of claim 3, wherein the monitored operative files are stored in root directories specified by the user.

6. The computer of claim 5, wherein an instance of the file regenerator is initiated for each of the root directories.

7. The computer of claim 6, comprising:
   a computer registry operable to store the indication in an operating system registry when the file regenerator replaces the modified operative file.

8. The computer of claim 1, comprising:
   a service register operable to register the file regenerator as a file-system object of the operating system.

9. The computer of claim 8, further comprising a message requestor operable to request a copy of any file change messages sent by the operating system.

10. The computer of claim 9, further comprising:

a computer registry operable to store the indication in the registry that the file regenerator has replaced the modified operative file.

11. A computer-readable storage medium containing instructions tangibly recorded on the storage medium, the instructions for causing a computer to perform steps comprising:

receiving an input from a user to specify operative files used by a computer system to be monitored, the specified files being a subset of files used by the computer system;

verifying that the user has provided backup copies of the operative files for replacing the operative files;

monitoring the operative files;

comparing the operative files with the backup files, or receiving messages indicating modifications to the operative files;

detecting modification of one of the operative files based on the comparing or one of the received messages while monitoring the operative files;

initiating replacement of the modified operative file with the backup copy of the modified operative file, the replacement of the modified operative file being initiated upon detecting when the modification of the operative file of whether the modification is a valid modification;

completing the replacement of the modified operative file with the backup copy of the modified operative file; and storing an indication that the modified operative file is replaced with the backup copy of the modified operative file.

12. The computer-readable storage medium of claim 11, further comprising instructions for:

initiating an instance of a file regeneration service to monitor the operative files upon receiving the user input.

13. The computer-readable storage medium of claim 12, wherein the step of comparing comprises:

comparing attributes of the operative files and the backup copies.

14. The computer-readable storage medium of claim 12, further comprising instructions for:

registering the file regeneration service as a file-system object of the operating system.

15. The computer-readable storage medium of claim 14, wherein the step of detecting further comprises:

requesting a copy of any file change messages sent by an operating system of the computer.

16. The computer-readable storage medium of claim 15, further comprising instructions for:

storing the indication in the registry that the file regeneration service has replaced the modified operative file.

17. The computer-readable storage medium of claim 16, wherein the monitored operative files are stored in root directories specified by the user.

18. The computer-readable storage medium of claim 13, further comprising instructions for:

storing the indication in a computer operating system registry when the file regeneration service replaces the modified operative file.

19. The computer-readable storage medium of claim 13, wherein the monitored operative files are stored in root directories specified by the user.

20. The computer-readable storage medium of claim 19, wherein an instance of the file regeneration service is initiated for each of the root directories.

21. The computer-readable storage medium of claim 20, further comprising instructions for:

storing the indication in a computer operating system registry when the file regeneration service replaces the modified operative file.

22. A computer with an operating system, the computer comprising:

an input device for receiving an input from a user to specify operative files used by a computer system to be monitored, the specified files being a subset of files used by the computer system;

means for verifying that the user has provided backup copies of the operative files for replacing the operative files;

means for initiating an instance of the file regeneration service to monitor the operative files;

means for monitoring the operative files with the file regeneration service;

means for comparing the operative files with the backup files, or receiving messages indicating modifications to the operative files;

means for detecting modification of one of the operative files based on the comparing or one of the received messages while the operative files are being monitored by the file regeneration service;

means for initiating replacement of the modified operative file with the backup copy of the modified operative file, the replacement of the modified operative file being initiated upon detecting when the modification of the operative file regardless of whether the modification is a valid modification;

means for completing the replacement of the modified operative file with the backup copy of the modified operative file; and means for storing an indication that the modified operative file is replaced with the backup copy of the modified operative file.

23. A computer-implemented method comprising the steps implemented by a computer of:

receiving an input from a user to specify operative files used by a computer system to be monitored by a file regeneration service, the specified files being a subset of files used by the computer system;

verifying that the user has provided backup copies of the operative files for replacing the operative files;

initiating an instance of the file regeneration service to monitor the operative files;

monitoring the operative files with the file regeneration service;

comparing the operative files with the backup files, or receiving messages indicating modifications to the operative files;

detecting modification of one of the operative files based on the comparing or one of the received messages while the operative files are being monitored by the file regeneration service;

initiating replacement of the modified operative file with the backup copy of the modified operative file, the replacement of the modified operative file being initiated upon detecting when the modification of the operative file regardless of whether the modification is a valid modification;

completing the replacement of the modified operative file with the backup copy of the modified operative file; and storing an indication that the modified operative file is replaced with the backup copy of the modified operative file.

24. The computer-implemented method of claim 23, wherein the file regeneration service is initiated upon receiving the user input.

25. The computer-implemented method of claim 24, wherein the comparing comprises:
   comparing attributes of the operative files and the backup copies.

26. The computer-implemented method of claim 25, comprising:
   storing the indication in a computer operating system registry when the file regeneration service replaces the modified operative file.

27. The computer-implemented method of claim 25, wherein the operative files are stored in root directories specified by the user.

28. The computer-implemented method of claim 27, wherein an instance of the file regeneration service is initiated for each of the root directories.

29. The computer-implemented method of claim 28, comprising:
   storing the indication in a computer operating system registry when the file regeneration service replaces the modified operative file.

30. The computer-implemented method of claim 23, comprising:
   registering the file regeneration service as a file-system object of an operating system of the computer.

31. The computer-implemented method of claim 30, wherein detecting further comprises:
   requesting a copy of any file change messages sent by the operating system.

32. The computer-implemented method of claim 31, wherein the operating system comprises a registry and the method comprises:
   storing the indication in the registry that the file regeneration service has replaced the modified operative file.

33. The computer-implemented method of claim 32, wherein the monitored operative files are stored in root directories specified by the user.

34. The computer-implemented method according to claim 23, further comprising storing a service record including a replacement time indicating when the modified operative file is replaced.

35. The computer-implemented method according to claim 34, wherein the service record includes a detection time indicating when the modification of the monitored operative file is detected.

36. The computer-implemented method according to claim 23, wherein the modification is detected by comparing binary composition of the at least one modified operative file with binary composition of the backup copy.

37. The computer-implemented method according to claim 23, wherein the monitored operative files are compared to the backup copies at predetermined intervals to detect the modification.

* * * * *